United States Patent [19]
Wu

[11] Patent Number: 5,988,701
[45] Date of Patent: Nov. 23, 1999

[54] BY-PASS TUBE MEMBER FOR A BY-PASS LEVEL INDICATOR

[76] Inventor: Ting-Kuo Wu, No. 29-2, Santeh St., Shulin Chen, Taipei Hsien, Taiwan

[21] Appl. No.: 09/007,447

[22] Filed: Jan. 15, 1998

[51] Int. Cl.⁶ ..................................................... F16L 41/08
[52] U.S. Cl. .............................. 285/197; 73/323; 73/328; 73/DIG. 5
[58] Field of Search ............................ 285/133.21, 133.4, 285/148.8, 148.28, 197, 354, FOR 138; 73/319, 323, 326, 328, DIG. 5

[56] References Cited

U.S. PATENT DOCUMENTS

| | | | |
|---|---|---|---|
| 376,255 | 1/1888 | Parker et al. | 285/354 X |
| 1,040,127 | 10/1912 | Bonesteel | 73/319 X |
| 3,072,421 | 1/1963 | Lloyd et al. | 285/354 X |
| 3,132,881 | 5/1964 | Corey | 285/197 |
| 3,258,822 | 7/1966 | Schlesch et al. | 285/197 X |
| 3,288,494 | 11/1966 | Callahan, Jr. et al. | 285/354 X |
| 4,512,190 | 4/1985 | Sledmere | 73/319 |
| 5,924,436 | 7/1999 | Kitani et al. | 285/197 X |

FOREIGN PATENT DOCUMENTS

| | | | |
|---|---|---|---|
| 1620765 | 1/1991 | U.S.S.R. | 285/197 |

Primary Examiner—Lynne H. Browne
Assistant Examiner—Greg Binda
Attorney, Agent, or Firm—Kolisch Hartwell; Dickinson McCormack & Heuser

[57] ABSTRACT

A by-pass level indicator includes a main tube in communication with a tank via a pair of by-pass tube members, a float containing a magnet and an indicator attachably mounted to the main tube and having a series of magnetic colored flags reacting with the magnet of the float for indicating level of the tank. Each of the by-pass tube members includes a T-joint having an upright tube receivably engaging with one end of the main tube and a transverse tube integrally extending from the upright tube communicating the main tube to the tank. The transverse tube has a male threaded end portion to partly receiving an O-ring. The by-pass tube member further has a combination of a union and a collar adapted to communicating the transverse tube with the tank. The collar is threadingly engaged with the male threaded end portion of the transverse tube and clamps a connecting tube of the union to the transverse tube simultaneously compressing a protruding portion of the O-ring, thereby achieving a fluid-tight seal.

1 Claim, 5 Drawing Sheets

BY-PASS TUBE MEMBER FOR A BY-PASS LEVEL INDICATOR

BACKGROUND OF THE INVENTION

1. Field of the Invention

The present invention relates to a pair of by-pass tube members for a by-pass level indicator, each of which is configured as a T-joint receiving one end of the main tube and secured with the main tube by means such as an adhesive, thereby obtaining a strengthened engagement therebetween and facilitating manufacture of the by-pass level indicator.

2. Description of Related Art

A bypass level indicator is installed outside of a vessel or tank and includes a liquid chamber, a float containing a magnet and disposed inside the liquid chamber and a series of colored magnetic flags. The bypass level indicator enables one to efficiently measure the level of the liquid inside the tank from an outside thereof.

Referring to FIG. 4, a bypass level indicator made of polypropylene includes a main tube 80 in communication with a tank via a pair of bypass tubes 82. The main tube 80 has a top cover 86 and a bottom cover 88 respectively engaged with a top end and a bottom end thereof and a series of colored magnetic flags which form an indicator 84 attachably mounted thereto. The top cover 86 and bottom cover 88 each define threaded bore to receive a respective plug (not shown) for maintenance purposes etc. The indication method between the magnet installed in the float and the magnetic colored flags is conventional and not described in detail here. The pair of bypass tubes 82 are respectively welded on an upper portion and a lower portion of the main tube 80.

This bypass level indicator has a disadvantage that it is difficult to weld the pair of bypass tubes 82 onto the main tube 80 satisfactorily, because the bypass tube 82 and the main tube are of circular peripheries and need to be welded with each other perpendicularly.

Another conventional bypass level indicator made of PVC is shown in FIG. 5. The bypass level indicator also includes a main tube 90 in communication with a tank via a pair of bypass tubes 922. This bypass level indicator does not employ a welding process to secure the pair of bypass tubes 922 to the main tube 90. Instead, it uses a pair of T-joints 92 to engagingly connecting the pair of bypass tubes 922 with the main tube 90. The pair of T-joints 92 are receivably interposed to an upper portion and a lower portion of the main tube 90, respectively, and a pair of covers 94 are used to cover a top end and a bottom end of the main tube 90. To securely engage with the main tube 90, each of the pair of T-joints 92 defines a middle portion 920 with a diameter slightly smaller than that of the main tube 90 for restricting movement of the main tube 90. This has a disadvantage that a float 98 received in the main tube 90 may be jammed due to the smaller diameter of the T-joint 92, resulting in a reduction of effective length of the main tube 92. Furthermore, the bypass level indicator typically has a pair of flanges 96 integrally formed on the pair of bypass tubes 922 to be mounted to the tank. Therefore, not only a volume and cost resulting from packaging the bypass tubes 922 and the flanges 96 will increase, but a damage to the pair of flanges 96 during assembling and transportation may occur.

The present invention provides an improved by-pass tube member for a by-pass level indicator to mitigate and/or obviate the aforementioned problems.

SUMMARY OF THE INVENTION

One object of the present invention is to provide a pair of by-pass tube members for a by-pass level indicator, each of which is configured as a T-joint receiving one end of the main tube and secured with the main tube by means such as an adhesive, thereby obtaining a strengthened engagement therebetween and facilitating manufacture of the by-pass level indicator.

Another object of the present invention is to provide a pair of bypass tube members for a by-pass level indicator, each by-pass tube member has a detachable union which is adapted to be mounted to a sidewall of a tank, whereby a volume and cost resulting from packaging the union can be reduced and damage to the union during assembly and transportation is avoided.

Other objects, advantages and novel features of the invention will become more apparent from the following detailed description when taken in conjunction with the accompanying drawings.

DETAILED DESCRIPTION OF PREFERRED EMBODIMENT

Figure 1:
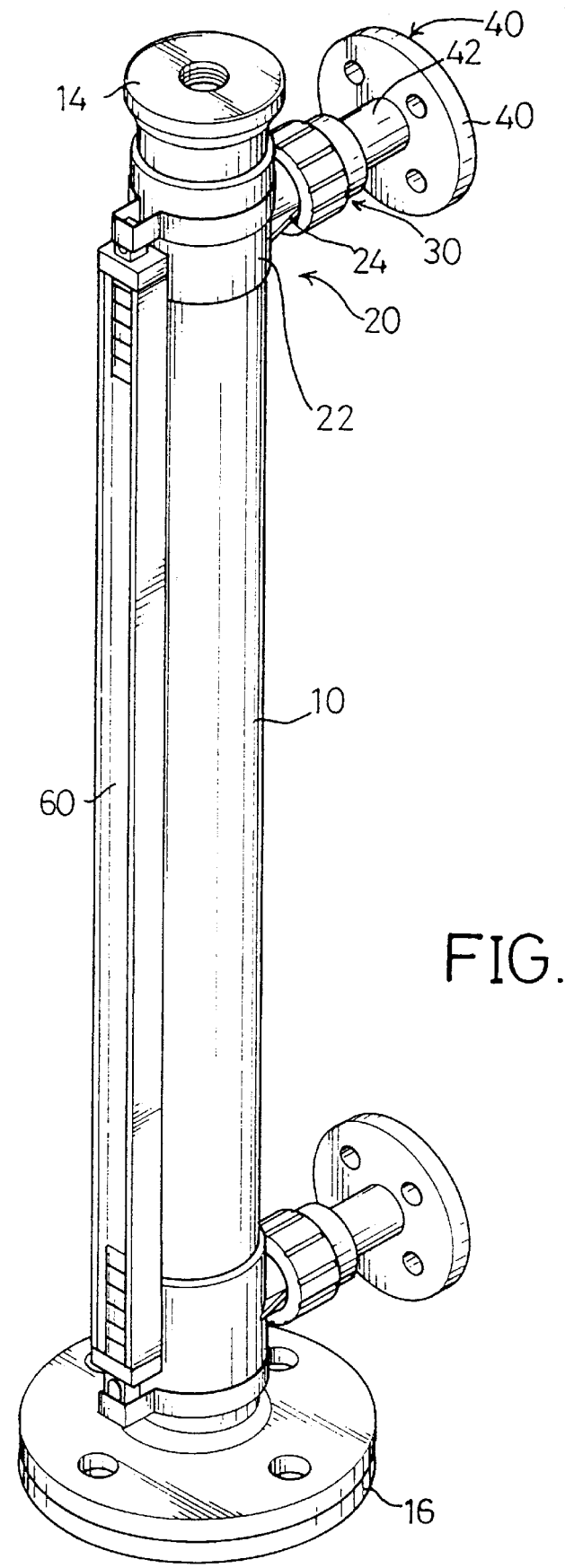
FIG. 1 is a perspective view showing a bypass level indicator utilizing a pair of by-pass tube members in accordance with the present invention.

Referring to FIG. 1, a by-pass level indicator utilizing a pair of by-pass tube members constructed in accordance with the present invention has a structure similar to a conventional level indicator, which has a main tube 10 in communication with a tank (not shown) via a pair of bypass tube members 20, a float (not numbered) and an indicator 60 comprising a series of magnetic colored flags (not numbered). The indicator 60 is attachably mounted to the main tube 10 for indicating level of the tank. The float contains a magnet to react with the series of magnetic colored flags which is conventional and not described in further detail. The series of magnetic colored flags is housed in a column secured to the main tube 10 by a pair of clips (not numbered). The pair of by-pass tube members 20 of the present invention are respectively configured as a T-joint and receivably engage with a top end and a bottom end of the main tube 10. A top cover 14 and a bottom cover 16 are mounted to a top end and a bottom end of a respective one of the T-joints. The top cover 14 and the bottom cover 16 each define a threaded bore (not numbered) for receiving a maintenance plug (not shown) therein. As the pair of by-pass tube members 20 are identical, only one is described hereafter.

Figure 2:
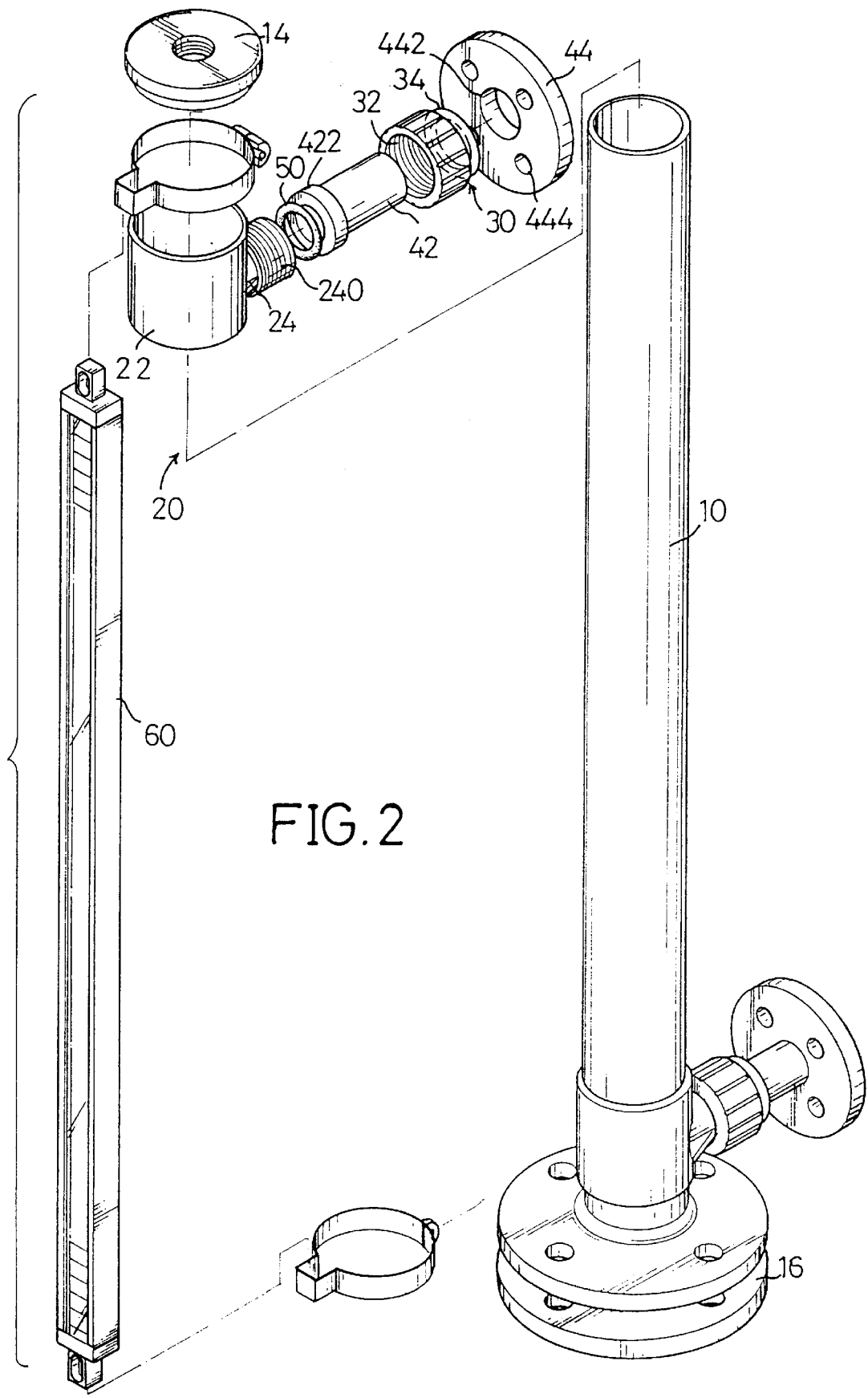
FIG. 2 is an exploded perspective view showing the by-pass tube members and the by-pass level indicator in accordance with the present invention.
Figure 3:
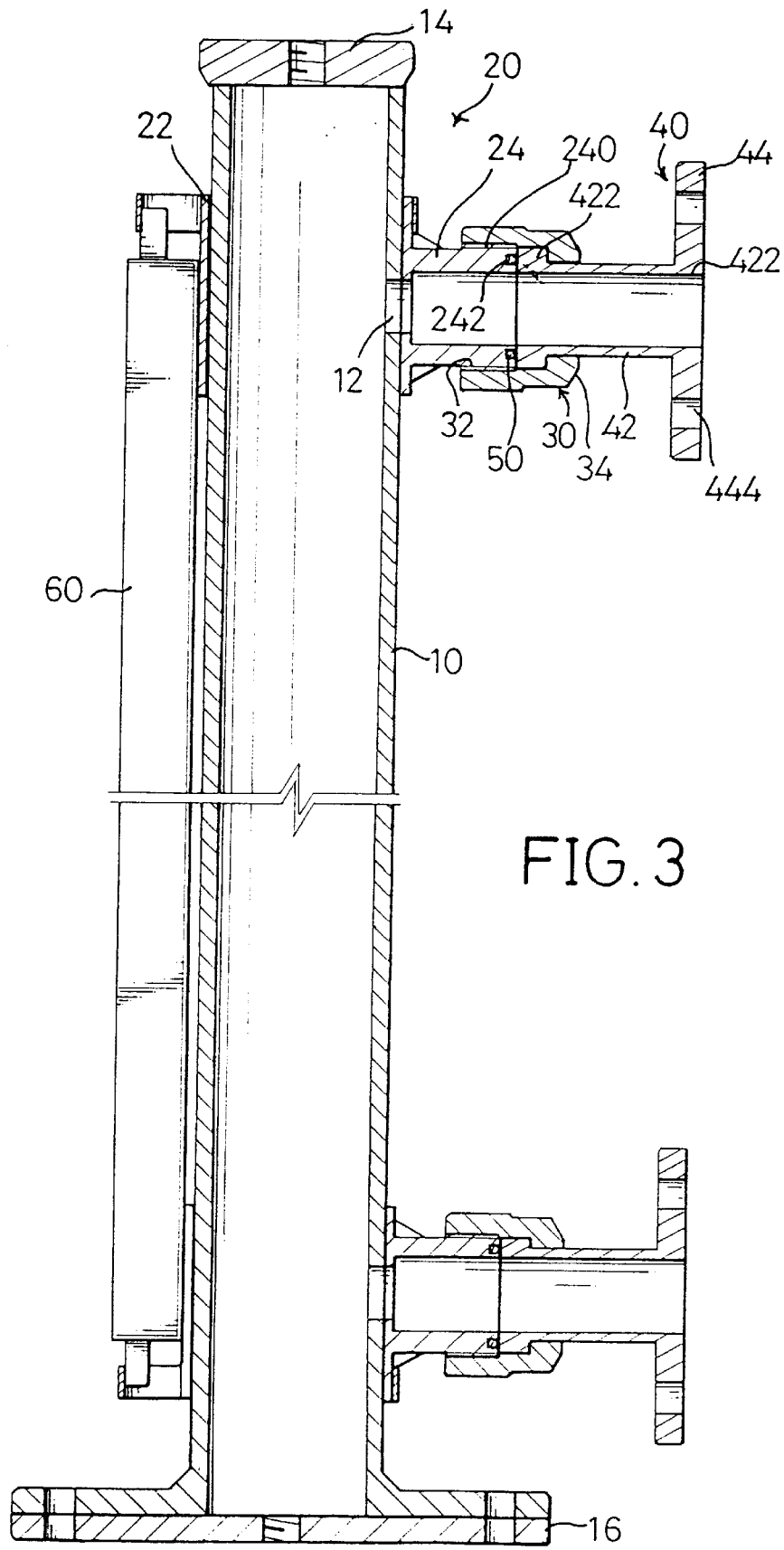
FIG. 3 is a sectional view of the by-pass level indicator with the bypass tube members in accordance with the present invention.
Figure 4:
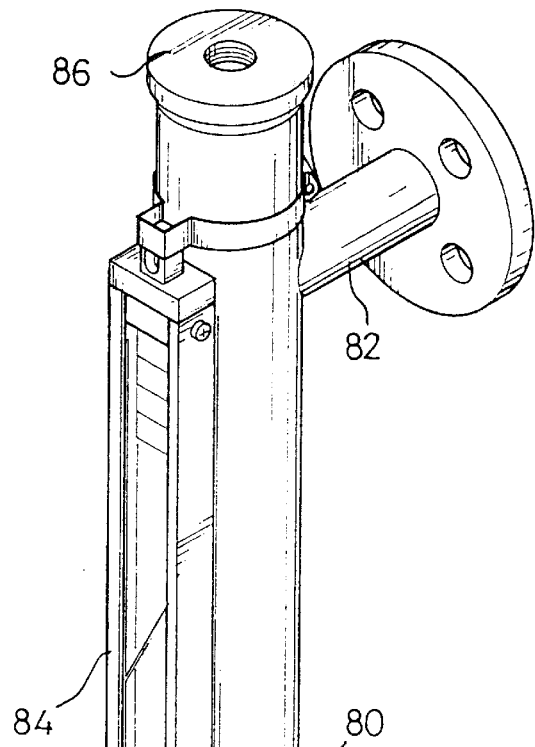
FIG. 4 is a perspective view showing a conventional by-pass level indicator.
Figure 5:
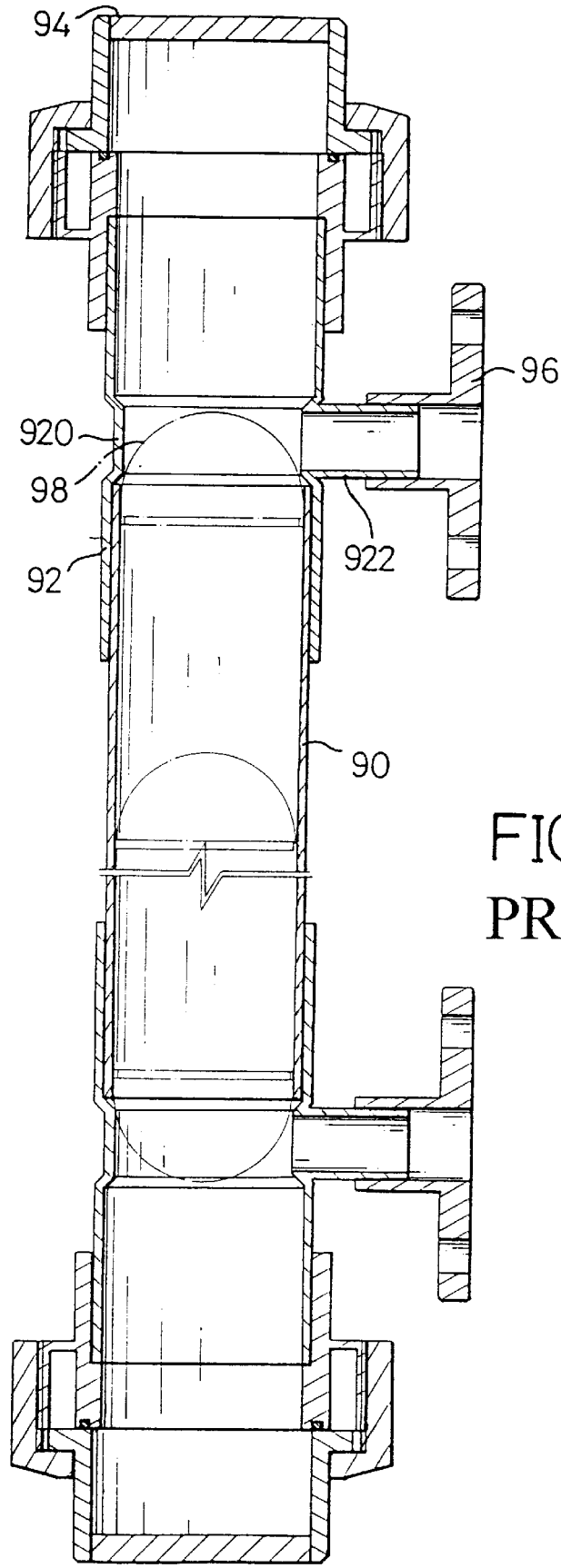
FIG. 5 is a sectional view showing an alternative conventional bypass level indicator.

Referring to FIG. 2, the bypass member 20 has an upright tube 22 and a transverse pipe 24 integrally extending from the upright tube 22. The upright tube 22 has a diameter slightly larger than that of the main tube 10, such that the main tube 10 can be received therein and secured therewith by means such as an adhesive. Since there is a large joint face between the main tube 10 and the upright tube 22 due to the engagement, the by-pass level indicator is not tended to be separated from the T-joint when it is struck accidentally. After the engagement of the main tube 10 and the upright tube 22 is completed, a periphery of the main tube 10 corresponding to the transverse tube 24 can be bored to form a hole 12 to communicate with the tank. The transverse tube 24 has a male threaded end portion 240 and a circular recess 242 defined in a distal end face thereof. The by-pass tube member 20 further includes a collar 30, a union 40 and an O-ring 50. The collar 30 includes a threaded bore 32 sized to matingly engage with the male threaded end portion 240 of the transverse tube 24, and a neck portion 34 at one end thereof. The neck portion 34 has an inside diameter smaller than that of the threaded bore 32.

The union 40 comprises a connecting tube 42 and a flange 44 with a central bore 442 and a plurality of through-holes 444 defined around the central bore 442. The connecting tube 42 has a first end sized to be snugly received in the central bore 442 of the flange 44 and having an outside diameter smaller than the inside diameter of the neck portion 34 of the collar 30 and a second end with a circumferential lip 422 formed on an outer periphery thereof. The circumferential lip 422 has an outer diameter larger than the inside diameter of the neck portion 34 but smaller than the diameter of the threaded bore 32 of the collar 30.

In assembly, the O-ring 50 is received in but slightly protrudes from the circular recess 242 of the transverse tube 24. The collar 30 is mounted over the connecting tube 42 such that the threaded bore 32 extends over the circumferential lip 422 and the neck portion 34 abuts the circumferential lip 422. The flange 44 is mounted on and fixedly secured by means such as welding to the first end of the connecting tube 42. The combined union 40 and collar 30 are fitted to the tank by retaining means such as bolts being extended through the through-holes 444 to be threadingly received in a sidewall of the tank. The collar 30 is threadingly engaged with the male threaded end portion 240 of the transverse tube 24 until the neck portion 34 of the collar 30 urges against the circumferential lip 422 to clamp the connecting tube 42 to the transverse tube 24 simultaneously compressing the protruding portion of the O-ring 50, whereby a fluid-tight seal is achieved.

It is to be noted that present molding techniques will allow the union 40 to be molded as an integral unit with the collar 30 being simultaneously molded therearound.

Accordingly, it is appreciated that the by-pass tube member 20 of the present invention does not affect an effective length of the main tube and by contrast to the conventional by-pass level indicator, a strong structure can be obtained.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A by-pass tube member for a by-pass level indicator, said by-pass level indicator having a main tube in communication with a tank via a pair of by-pass tube units, a float containing a magnet and an indicator attached to the main tube and having a series of magnetic colored flags reacting with the magnet of the float for indicating a level of the tank, each of said by-pass tube members comprising:

a T-joint having an upright tube receivably engaging with a periphery of the main tube and a transverse tube integrally extending from the upright tube communicating the main tube to the tank, said transverse tube having a male threaded end portion;

a union having a flange mounted on the tank and a connecting tube having a first end engaging with the flange;

a collar engagingly connecting the transverse tube of the T-joint to the union;

wherein said collar has a threaded bore sized to engage matingly with the male threaded end portion of the transverse tube;

wherein said collar further has a neck portion formed at one end thereof and said connecting tube of the union has a second end received in the collar, said second end of the connecting tube having a circumferential lip formed on an outer periphery thereof, said circumferential lip having an outer diameter larger than the inside diameter of the neck portion; and wherein said transverse tube of the T-joint has a circular recess defined in a distal end face thereof to receive an O-ring in such a manner that a part of the O-ring slightly protrudes from the circular recess of the transverse tube.

* * * * *